United States Patent
Toyoda et al.

(12) 
(10) Patent No.: US 6,290,588 B1
(45) Date of Patent: Sep. 18, 2001

(54) JIG FOR PRODUCING OPTICAL PARTS

(75) Inventors: Shuhei Toyoda; Akira Hamajima, both of Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/243,666

(22) Filed: Feb. 2, 1999

(30) Foreign Application Priority Data

Feb. 4, 1998 (JP) .................................................. 10-023496

(51) Int. Cl.⁷ .................................................. B24B 41/06
(52) U.S. Cl. .................... 451/384; 451/386; 451/390; 451/391
(58) Field of Search .................... 451/397, 402, 451/384, 386, 390, 391

(56) References Cited

U.S. PATENT DOCUMENTS

| 4,491,222 | * | 1/1985 | Gaccetta et al. .................... 206/394 |
| 4,591,109 | * | 5/1986 | Kremer ................................ 242/129 |
| 4,693,035 | * | 9/1987 | Doyle ...................................... 51/125 |
| 4,743,115 | * | 5/1988 | Arditty et al. ........................ 356/350 |
| 4,752,043 | * | 6/1988 | Heinzer ................................... 242/18 |
| 4,979,334 | * | 12/1990 | Takahashi ............................... 51/120 |
| 5,031,779 | * | 7/1991 | Szenay et al. .......................... 211/40 |
| 5,037,204 | * | 8/1991 | Poisel et al. .......................... 356/350 |
| 5,319,440 | * | 6/1994 | Kersey et al. ........................ 356/350 |
| 5,345,323 | * | 9/1994 | Basavanhally et al. ............... 385/59 |
| 5,444,534 | * | 8/1995 | Dyott et al. .......................... 356/350 |
| 5,547,418 | * | 8/1996 | Takahashi ............................. 451/278 |
| 5,657,198 | * | 8/1997 | Flener .................................. 361/220 |
| 5,671,316 | * | 9/1997 | Yuhara et al. ........................ 385/137 |
| 5,812,726 | * | 9/1998 | Jinnai et al. .......................... 385/137 |

* cited by examiner

Primary Examiner—Allen Ostrager
Assistant Examiner—William Hong
(74) Attorney, Agent, or Firm—Burr & Brown

(57) ABSTRACT

A jig for producing optical parts comprises a base stand for stacking ten individuals of fiber coil reels around which optical fibers are wound in a predetermined number of turns respectively, and array-holding mechanisms provided on a circumferential surface of the base stand, for downwardly exposing respective end surfaces of arrays secured to ends of the plurality of optical fibers led from the respective stacked fiber coil reels. Accordingly, it is possible to highly accurately polish the end surfaces of the array members secured to the ends of the optical fibers led from the plurality of reels respectively. It is possible to eliminate almost all dispersion in polishing accuracy among the array members, and it is possible to produce the optical parts highly accurately with a good yield.

12 Claims, 8 Drawing Sheets

JIG FOR PRODUCING OPTICAL PARTS

BACKGROUND OF THE INVENTION

1. Field of the Invention

The present invention relates to a jig for producing optical parts. In particular, the present invention relates to a jig for producing parts, which is preferably used, for example, to polish each of end surfaces of array members secured to optical coupling ends of optical fibers led from reels around which the fibers are wound in a predetermined number of turns respectively.

2. Description of the Related Art

Recently, an optical fiber gyroscope has been suggested, which is extremely advantageous in operability, convenient handling performance, and realization of a compact and light weight system, and which is also advantageous in improvement in durability because there is no mechanically movable component. Development is being rapidly advanced at present in order to practically use such an optical fiber gyroscope.

The system of the optical fiber gyroscope will now be briefly explained. The optical fiber gyroscope is a sensor for detecting the angular velocity based on the phase difference (Sagnac phase difference) between two light beams transmitted clockwise and counter clockwise in a fiber coil obtained by winding an optical fiber having a length of several tens meters in a predetermined number of turns. The optical fiber gyroscope is classified into those belonging to the open loop system and those belonging to the closed loop system depending on the method for detecting the phase difference.

When it is intended to produce an optical part such as an optical fiber gyroscope which is excellent in, for example, compact and light weight properties and durability as described above, the process for assembling the optical part especially comprises the steps of winding a lengthy optical fiber around a cylindrical object to produce a fiber coil, optically coupling an optical IC chip (optical waveguide) incorporated with a phase modulator to two ends of the optical fiber led from the fiber coil, optically coupling an optical fiber led from a light source to an optical fiber to be led to a photodetector by using a coupler, optically coupling an optical fiber led from the coupler to the optical IC chip, and packaging the optical IC chip.

In the step of optically coupling the optical IC chip to the optical fiber as described above, the following procedure is assumed. That is, an array member is secured to an optical coupling end of the optical fiber to make optical coupling to the optical IC chip. Thus, for example, a start end and a terminal end of the optical fiber are optically coupled to the optical IC chip.

According to such a procedure, the use of the array member makes it possible to previously define the spacing distance between the both ends in conformity with the coupling portion of the optical IC chip. Further, the direction of the polarization plane of the light transmitted through the optical fiber can be adjusted beforehand to the direction of the polarization plane of the light transmitted through the optical waveguide. Therefore, when the optical fiber is actually optically coupled to the optical IC chip, it is unnecessary to consider the spacing distance and the direction of the polarization plane one by one. Accordingly, it is possible to contemplate an efficient operation of the optical coupling.

Before the array member, which is secured to the end of the optical fiber led from the reel, is attached to the optical IC chip, the surface of the array member, on which the array member is attached to the optical IC chip, is previously polished. By doing so, it is possible to make highly accurate optical coupling between the optical fiber and the optical IC chip.

In order to polish the array member, the following method is assumed. That is, for example, a reel-placing stand is installed outside a rotary polishing surface plate. A reel is placed on the reel-placing stand, and the optical fiber is drawn from the reel so that the array member secured to is end is positioned on the polishing surface plate. Further, the array member is polished while allowing the end surface of the array member to contact with the polishing surface plate. In this method, the array member is pressed against the polishing surface plate manually or by using a mechanical chucking mechanism.

When the performance for mass production is taken into consideration, the following method is assumed. That is, for example, ten individuals of reel-placing stands are installed around the polishing surface plate. Reels are placed on the respective reel-placing stands. The array members, which are secured to ends of optical fibers drawn from the respective reels, are positioned on the polishing surface plate to polish the ten array members in the same manner as described above.

However, in the case of the polishing methods as described above, a skilful technique is required to correctly position, on the polishing surface plate, the end surface of the array member secured to the end of the optical fiber drawn from the reel. Further, it is impossible to perform the polishing operation while allowing the array member itself to make rotation on its axis. Therefore, a problem newly arises in that the dispersion in polishing accuracy tends to increase among the array members.

SUMMARY OF THE INVENTION

The present invention has been made taking the foregoing problems into consideration, an object of which is to provide a jig for producing optical parts, which makes it possible to highly accurately polish respective end surfaces of array members secured to ends of optical fibers drawn from a plurality of reels respectively, eliminate almost all dispersion in polishing accuracy among the array members, and produce the optical parts highly accurately with a good yield.

Another object of the present invention is to provide a jig for producing optical parts, which makes it possible to produce the optical parts inexpensively and stably with good operability and with good reproducibility.

According to the present invention, there is provided a jig for producing optical parts, comprising a base stand for stacking a plurality of reels around which lengthy fibers are wound in a predetermined number of turns respectively, and array-holding sections disposed on a circumferential surface of the base stand, for downwardly exposing respective end surfaces of array members secured respectively to optical coupling ends of the plurality of fibers led from the respective reels stacked on the base stand.

Accordingly, the plurality of reels are firstly stacked on the base stand. The lengthy fibers are wound around the respective reels. The array members are secured to the ends of the respective optical fibers. The optical fibers are drawn from the respective reels, and the array members, which are secured to the respective ends thereof, are held by the array-holding sections provided on the circumferential surface of the base stand. When the array members are held as described above, the end surfaces of the respective array members are exposed downwardly from the base stand.

In this state, when the producing jig is placed on a polishing surface plate of a polishing apparatus, the exposed end surfaces of the array members contact with the polishing surface plate. The end surfaces of the plurality of array members are simultaneously polished by rotating the polishing surface plate.

Since the plurality of reels are stacked, the plurality of array members are uniformly pressed against the polishing surface plate by the aid of their own weights. Accordingly, the end surfaces of the respective array members are polished highly accurately. As a result, it is possible to eliminate almost all dispersion in polishing accuracy among the respective array members, and it is possible to produce the optical parts highly accurately with a good yield. That is, the present invention makes it possible to produce the optical parts inexpensively and stably with good operability and with good reproducibility.

It is preferable for the jig constructed as described above to further comprise guide members attached detachably to the array-holding sections, for making regulation so that the end surfaces of the array members exposed downwardly from the base stand are horizontal. In this arrangement, a variety of array members can be highly accurately polished by appropriately attaching, to the array-holding sections, the guide members which are adapted to the array members to be polished.

It is preferable for the jig constructed as described above to further comprise array-placing sections provided on the base stand, for placing the plurality of array members, the array-placing sections having meshed bottoms. When the polishing step is completed, the array members are ordinarily introduced into the washing step to wash their polished surfaces. In the present invention, the respective array members are removed from the array-holding sections at the stage of completion of the polishing process for the end surfaces of the plurality of array members, and they are placed on the array-placing sections. The array members can be introduced into the washing step as they are (in a state in which the plurality of reels are stacked on the base stand, and the array members are placed on the array-placing sections). In this arrangement, the bottoms of the array-placing sections are formed to have the meshed structure. Therefore, it is possible to efficiently wash the polished array members with a washing liquid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Explanation will be made below with reference to FIGS. 1 to 8 for an illustrative embodiment of the jig for producing optical parts according to the present invention (hereinafter simply referred to as "jig according to the embodiment") and for an illustrative embodiment of the polishing apparatus according to the present invention (hereinafter simply referred to as "polishing apparatus according to the embodiment"). Before that, explanation will be made with reference to FIGS. 1 to 4 for an arrangement of an optical part to which the jig and the polishing apparatus according to the embodiment of the present invention are applied.

Figure 1:
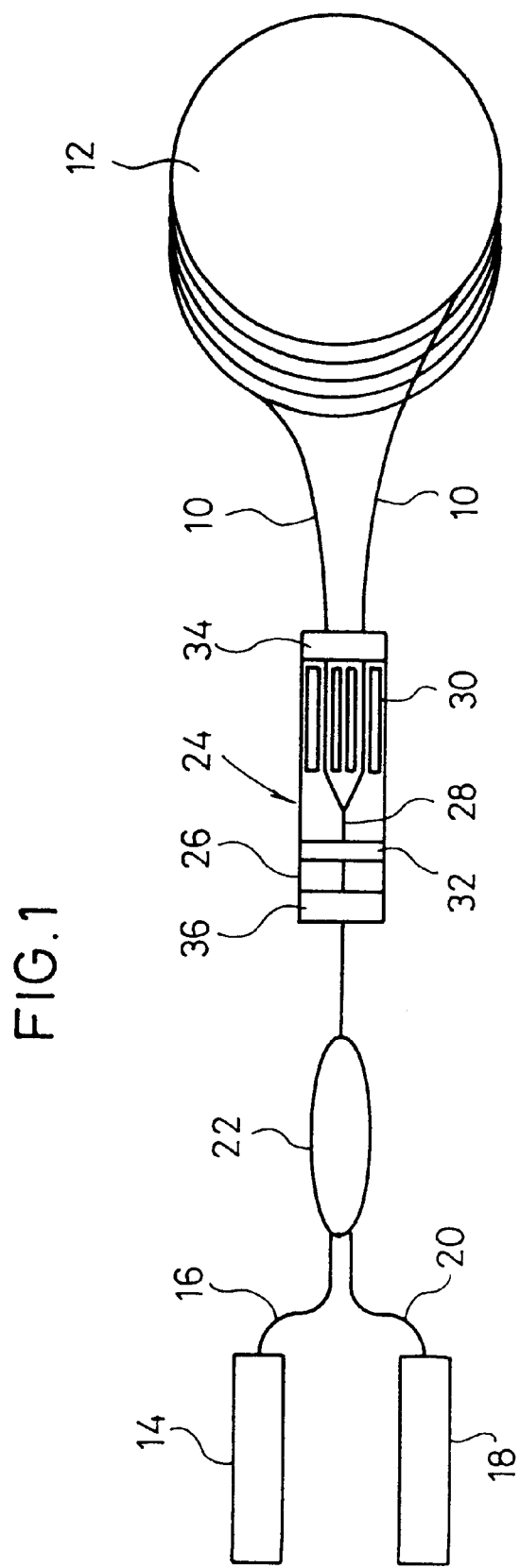
FIG. 1 schematically shows a structure of an optical fiber gyroscope as one of optical parts to be produced by using a jig according to an embodiment of the present invention.

The optical part is, for example, an optical fiber gyroscope. As shown in FIG. 1, the optical fiber gyroscope comprises a fiber coil 12 composed of a lengthy optical fiber 10 wound in a predetermined number of turns, a coupler 22 for optically coupling an optical fiber 16 led from a light source 14 to an optical fiber 20 led to a photodetector 18, and an optical IC chip 24 arranged between the fiber coil 12 and the coupler 22. The optical IC chip 24 comprises, for example, an optical waveguide 28 (for example, a Y-shaped optical waveguide) having a predetermined configuration formed on an LiNbO$_3$ substrate 26. A phase modulator 30 and a polarizer 32 are mounted on the optical waveguide 28. For example, a super luminescent diode (SLD) can be used as the light source 14.

In this embodiment, two ends (an end 10a and an end 10b, see FIG. 2A) of the optical fiber 10 led from the fiber coil 12 are secured to a first array 34 for regulating the attaching direction with respect to the optical IC chip 24. One end (an end 16a of the optical fiber 16 led from the light source 14, see FIG. 3A) of the optical fiber led from the coupler 22 is secured to a second array 36 for regulating the attaching direction with respect to the optical IC chip 24. The respective ends 10a, 10b, 16a of the respective optical fibers 10, 16 are optically coupled to the optical IC chip 24 via the first and second arrays 34, 36.

Figure 2A:
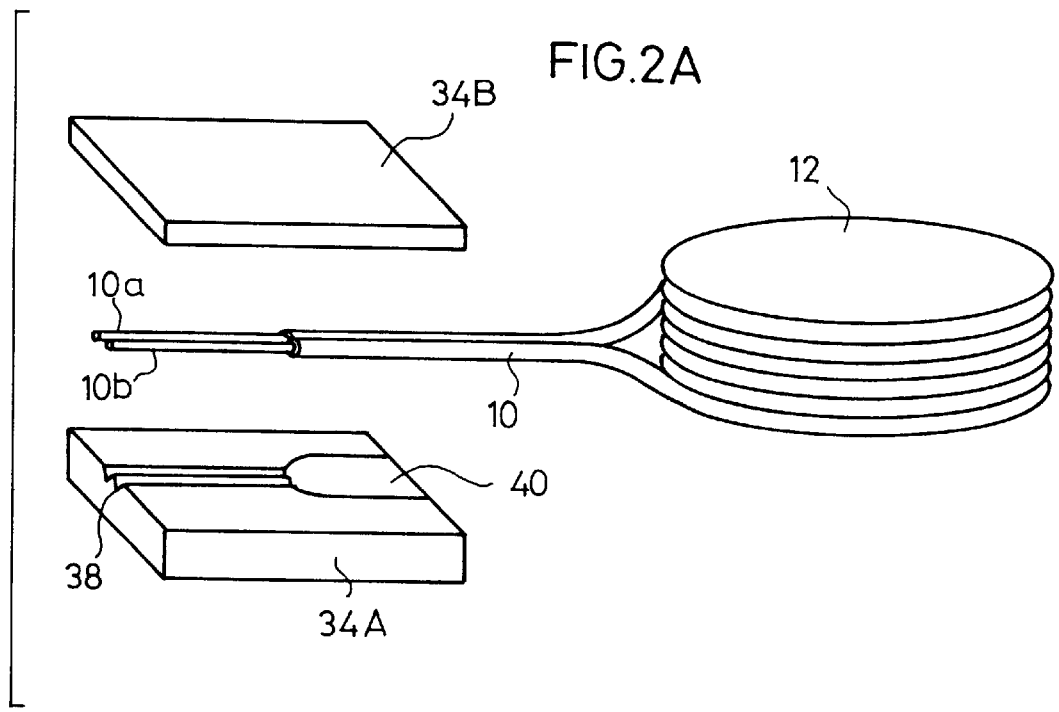
FIG. 2A illustrates an assembling step carried out when a first array is attached to an optical fiber led from a fiber coil.

Specifically, as shown in FIG. 2A, the first array 34 comprises, on one principal surface, a substrate 34A which is formed with, in a continuous manner, two V-shaped grooves 38a, 38b extending toward one end surface and a groove 40 extending toward the other end surface, and a cover substrate 34B for closing the respective grooves 38a, 38b, on the substrate 34A.

Figure 2B:
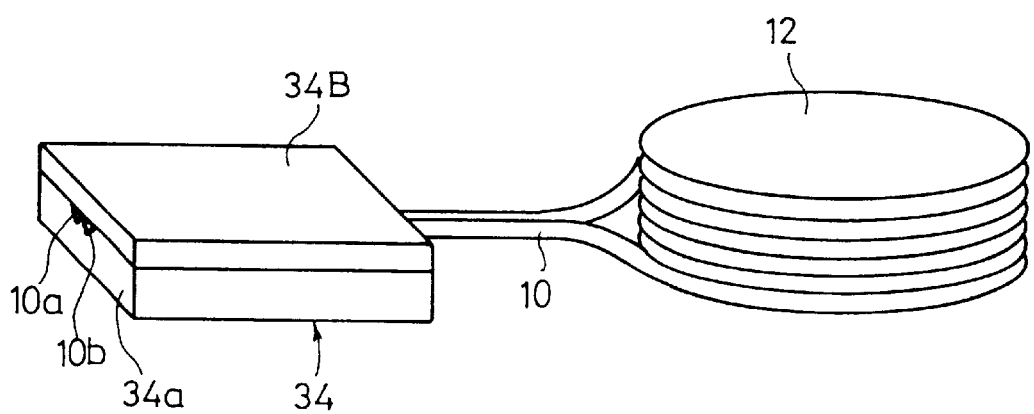
FIG. 2B illustrates a polishing step carried out when the first array is attached to the optical fiber led from the fiber coil.

When the first array 34 is assembled, the two ends 10a, 10b of the optical fiber 10, which are led from the fiber coil 12, are firstly embedded in the V-shaped grooves 38a, 38b of the substrate 34A as shown in FIG. 2A. After that, the polarization-conserving plane of the optical fiber 10 is adjusted to the direction of the polarization plane of light transmitted through the optical waveguide 28 (for example, the major axis direction of the core cross section is adjusted, for example, to the horizontal direction). Subsequently, the cover substrate 34B is placed thereon to glue the both by using an adhesive. As shown in FIG. 2B, the end surface 34a disposed on the free end of the optical fiber 10, of the end surfaces of the first array 34 is polished to complete the operation for securing the first array 34 to the optical fiber 10.

Figure 3A:
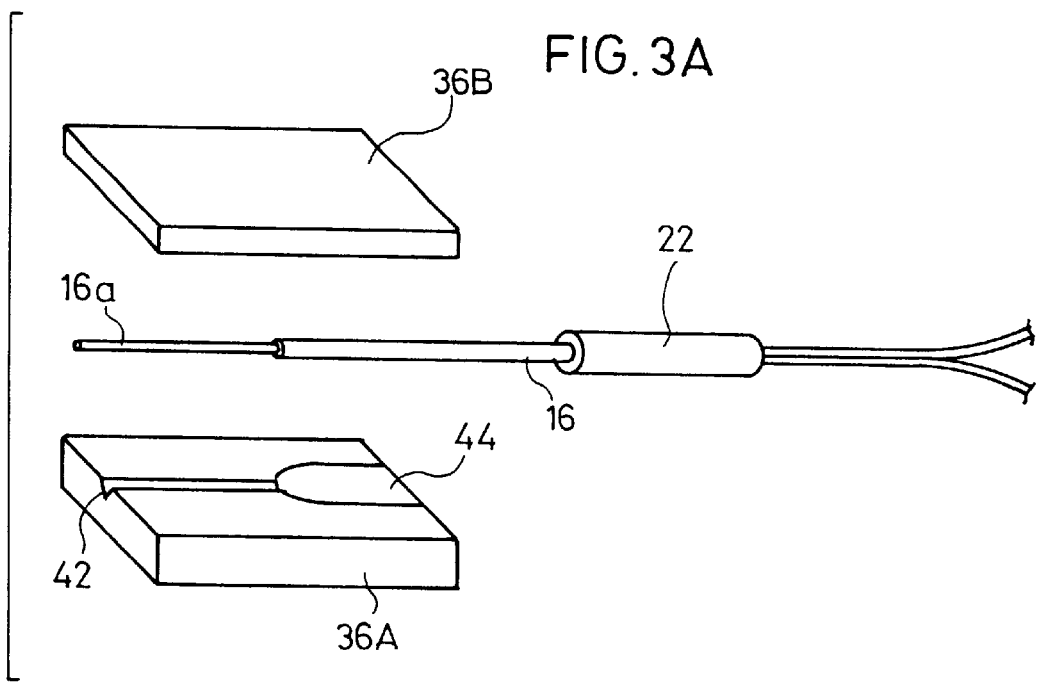
FIG. 3A illustrates an assembling step carried out when a second array is attached to an optical fiber led from a coupler.

As shown in FIG. 3A, the second array 36 comprises, on one principal surface, a substrate 36A which is formed with, in a continuous manner, one V-shaped groove 42 extending toward one end surface and a groove 44 extending toward the other end surface, and a cover substrate 36B for closing the respective grooves 42, 44 on the substrate 36A.

Figure 3B:
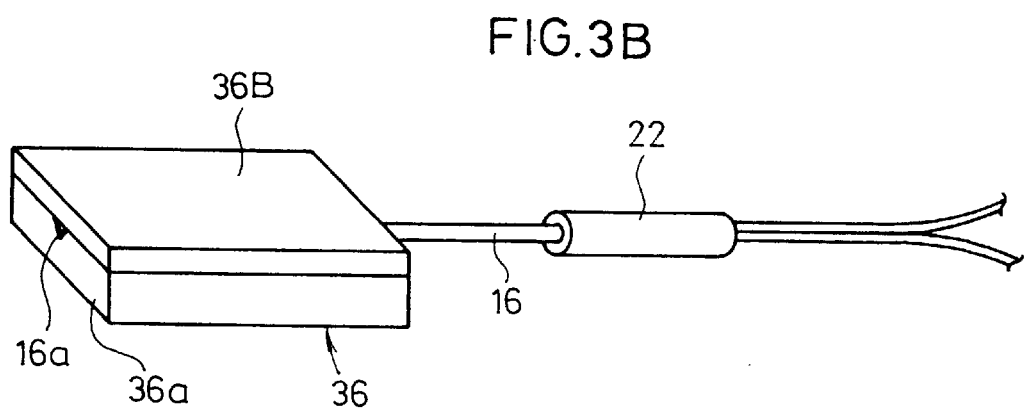
FIG. 3B illustrates a polishing step carried out when the second array is attached to the optical fiber led from the coupler.

When the second array 36 is assembled, the one end 16a of the optical fiber 16, which is led from the coupler 22, is firstly embedded in the V-shaped groove 42 of the substrate 36A as shown in FIG. 3A. After that, the polarization-conserving plane of the optical fiber 16 is adjusted to the direction of the polarization plane of light transmitted through the optical waveguide 28 (for example, the major axis direction of the core cross section is adjusted, for example, to the horizontal direction). Subsequently, the cover substrate 36B is placed thereon to glue the components by using an adhesive. As shown in FIG. 3B, the end surface 36a disposed on the free end of the optical fiber 16, of the end surfaces of the second array 36 is polished to complete the operation for securing the second array 36 to the optical fiber 16.

Figure 4A:
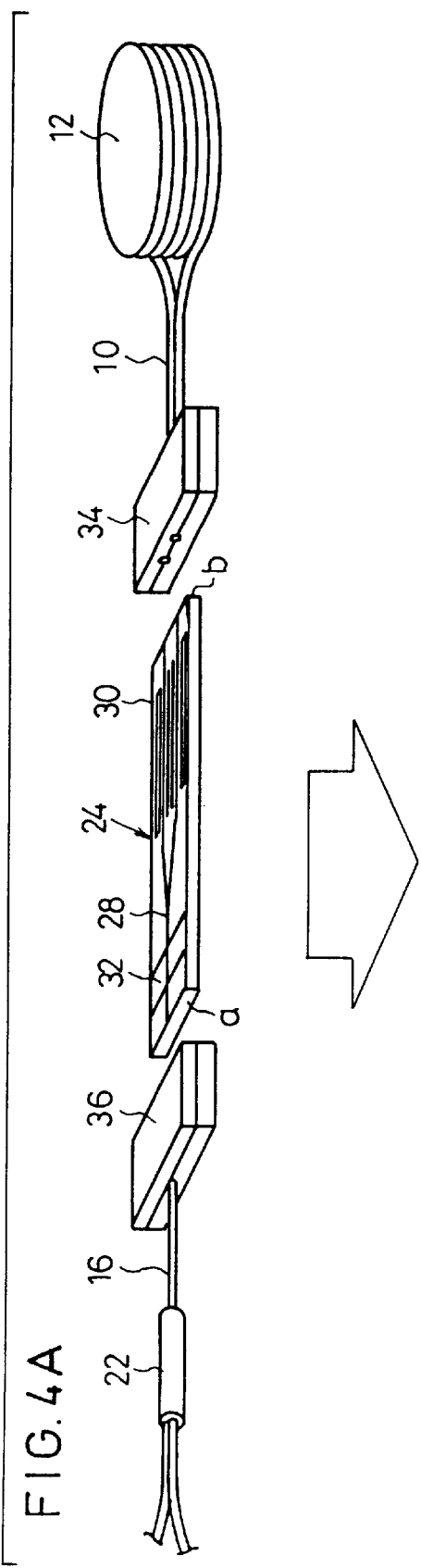
FIG. 4A illustrates an attaching step, especially a position-adjusting step for an optical IC chip and the first and second arrays.

As shown in FIG. 4A, the first and second arrays 34, 36, to which the optical fibers 10, 16 have been already secured, are attached to one optical IC chip 24 respectively. The both end surfaces a and b of the optical IC chip 24 are attached to the arrays 34, 36 as follows. That is, the second array 36 is attached to the end surface a in the vicinity of the polarizer 32, and the first array 34 is attached to the end surface b in the vicinity of the phase modulator 30, while adjusting their optical axes respectively.

Figure 4B:
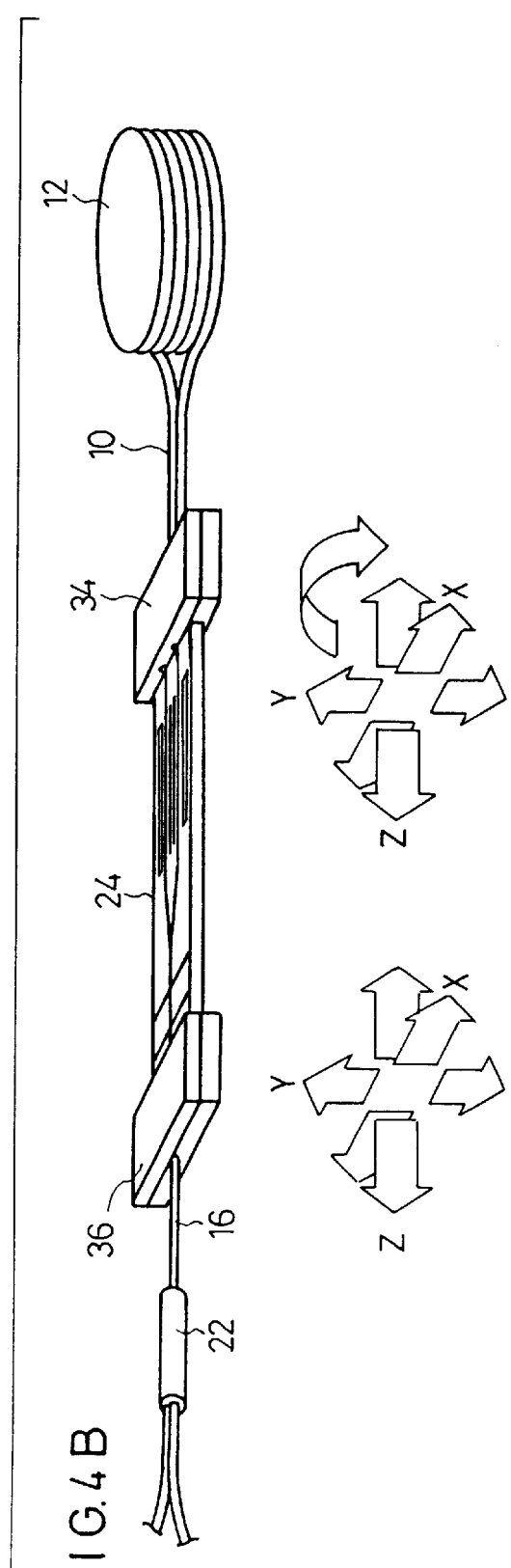
FIG. 4B illustrates the attaching step, especially an optical axis-adjusting step for the optical IC chip and the first and second arrays.

The respective arrays 34, 36 are attached (glued by using an adhesive in this embodiment) while adjusting their optical axes so that the optical output is maximized. As shown in FIG. 4B, the optical axis is adjusted for the first array 34 for the three axial directions of X, Y, Z and for the two core rotational directions. The optical axis is adjusted for the second array 36 for the three axial directions of X, Y, Z.

Figure 5:
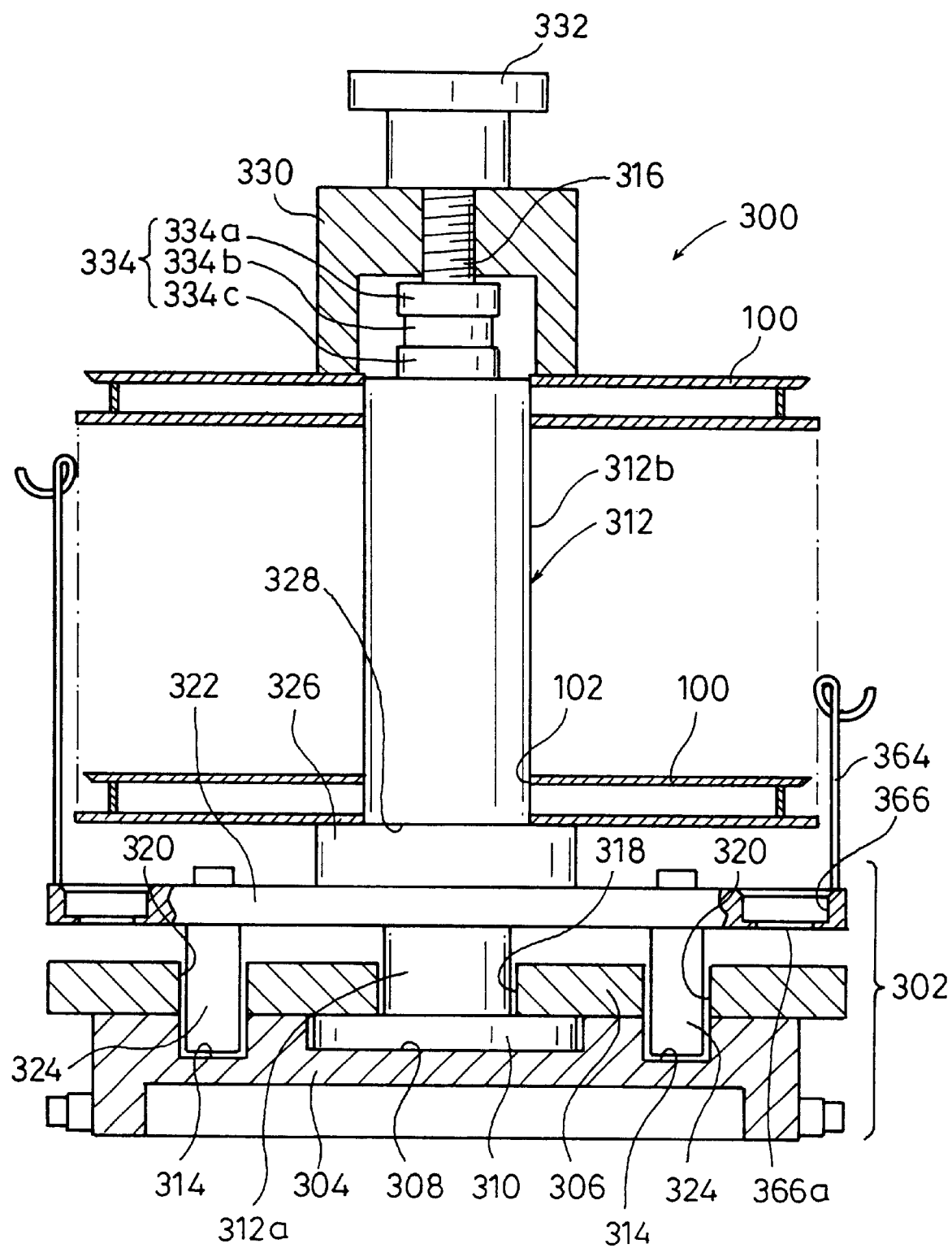
FIG. 5 shows a front view illustrating, with partial cutaway, the jig according to the embodiment of the present invention.

As shown in FIG. 5, a jig 300 according to the embodiment of the present invention comprises a base stand 302 for stacking a plurality of fiber coil reels 100 or a plurality of coupler reels (not shown). The fiber coil reel 100 is a reel for winding therearound the optical fiber 10 for constructing the fiber coil 12, and it has a central through-hole 102 (see FIG. 5). The coupler reel (not shown) is a reel for winding therearound the optical fiber 16 led from the coupler 22.

Explanation will now be made with reference to FIGS. 5 and 6 for the jig according to the embodiment of the present invention as represented by the jig 300 for polishing the array 34 secured to the optical fiber 10 drawn from the fiber coil reel 100. The base stand 302 of the jig 300 according to the embodiment of the present invention comprises a pedestal 304 disposed at its bottom and a first base plate 306. The pedestal 304 has its diameter which is slightly smaller than the diameter of the fiber coil reel 100 or the coupler reel. The first base plate 306 is attached on the pedestal 304, it has its diameter which is larger than the diameter of the pedestal 304, and it has its thickness which is about ½ of that of the pedestal 304.

A recess 308, which has its diameter larger than that of the through-hole 102 of the fiber coil reel 100, is formed at an upper central portion of the pedestal 304. A disk 310, which has its diameter slightly smaller than the diameter of the recess 308 and which has its thickness approximately the same as the height of the recess 308, is accommodated in the recess 308. A support shaft 312, which extends in the vertical direction, is secured to the center of the disk 310, for example, by being fastened by a screw. Recesses 314, each of which has, for example, a circular configuration, are formed, for example, at four positions located on a concentric circle on the pedestal 304.

A part of the support shaft 312, which extends over a predetermined length from the end on the side to be secured to the disk 310 (hereinafter conveniently referred to as "attachment section 312a"), has its diameter which is smaller than the diameter of the through-hole 102 of the fiber coil reel 100. Another part of the support shaft 312, which corresponds to a portion for stacking the fiber coil reels 100 (hereinafter conveniently referred to as "stacking section 312b"), has its diameter which is approximately the same as the diameter of the through-hole 102. A bolt member 316 is screwed into the support shaft 312 at its upper end.

A through-hole 318, which has its diameter slightly larger than the diameter of the attachment section 312a of the support shaft 312, is formed at the center of the first base plate 306. The attachment section 312a of the support shaft 312 is inserted through the through-hole 318. Through-holes 320, each of which has an identical diameter, are formed at positions of the first base plate 306 corresponding to the four recesses 314 provided on the pedestal 304.

The base stand 302 further comprises a second base plate 322 which is fixed at a position corresponding to an approximately central portion in the lengthwise direction of the attachment section 312a of the support shaft 312. The second base plate 322 has, at its center, a through-hole (not shown) which is formed with its diameter slightly larger than the diameter of the attachment section 312a of the support shaft 312. The attachment section 312a of the support shaft 312 is inserted through the through-hole. Columnar members 324, which extend downwardly at positions corresponding to the four recesses 314 provided on the pedestal 304, are secured to the lower surface of the second base plate 322, for example, by being secured by screws. Each of the columnar members 324 has its diameter which is smaller than the diameter of the recess 314, and its height which is approximately the same as the length ranging from the lower surface of the second base plate 322 to the bottom of the recess 314 on the pedestal 304.

A ring member 326, which has its inner diameter slightly larger than the diameter of the attachment section 312a of the support shaft 312, is secured to a central portion of the upper surface of the second base plate 322, for example, by being fastened by a screw. The height of the ring member 326 is approximately the same as the length ranging from the upper surface of the second base plate 324 to the deepest end of the attachment section 312a of the support shaft 312. Therefore, the support shaft 312 is fixed at its end to the disk 310 which is accommodated in the recess 308 of the pedestal 304, giving a conformation in which a step section 328 of the support shaft 312 contacts with the upper surface of the ring member 326. Thus, the support shaft 312 is stably supported in the vertical direction.

The stacking section 312b of the support shaft 312 has its length which is approximately the same as the height obtained by stacking the ten fiber coil reels 100. Therefore, the ten fiber coil reels 100 are stacked by successively inserting the fiber coil reels 100 into the support shaft 312.

A cap-shaped pressing member 330 is inserted into the bolt member 316 which is screwed into the support shaft 312 at its upper end. A nut member 332 disposed thereon is further screwed thereinto. When the nut member 332 is screwed downwardly, the ten fiber coil reels 100 can be pressed by the lower end surface of the pressing member 330 disposed thereon. In order to avoid any excessive pressing action of the pressing member 330, it is preferable to previously insert collar members 334 into the bolt member 316 before inserting the pressing member 330. In the embodiment shown in FIG. 5, three collar members (334a, 334b, 334c) are inserted. Thus, the pressing member 330 can be prevented from movement downwardly beyond the upper end of the uppermost collar member 334a.

Figure 6:
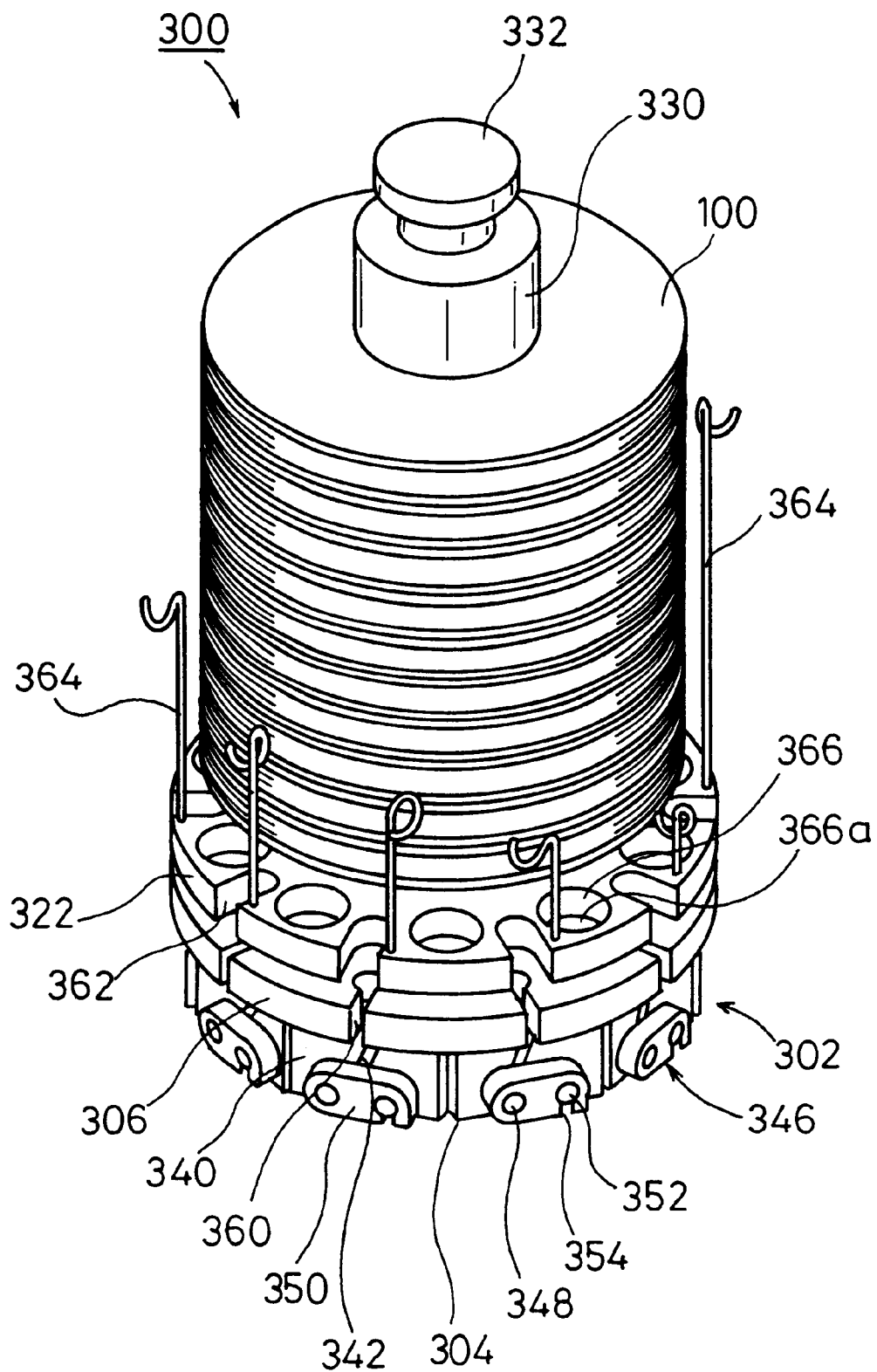
FIG. 6 shows a perspective view illustrating the jig according to the embodiment of the present invention.

As shown in FIG. 6, ten individual guide members 340 are arranged and fixed by being fastened by screws respectively on the circumferential surface of the pedestal 304. Each of the guide members 340 is formed with a guide groove 342 which has approximately the same width as the lateral width of the array 34.

The guide groove 342 is inclined in conformity with the angle of the end surface of the array 34. The angle of inclination of the guide groove 342 with respect to the vertical direction is approximately the same as the angle of inclination of the end surface of the array 34. An array-holding mechanism 346 for closing a part of the guide groove 342 is provided at a lower portion of the guide member 340. The array-holding mechanism 346 comprises a support shaft 348 provided at the lower portion of the guide member 340, a holding tab 350 rotatably attached to the support shaft 348, and a stopper 352 for regulating rotation of the holding tab 350.

The holding tab 350 is formed with a U-shaped cutout 354 which is open on the side of the lower surface. When the holding tab 350 is rotated in a certain direction so that the part of the guide groove 342 is closed to arrive at a stage in which the lower surface of the holding tab 350 is approximately coincident with the lower surface of the pedestal 304, then the stopper 352 abuts against the inner end of the cutout 354 to inhibit further downward rotation.

On the other hand, keyhole-shaped cutouts 360 are formed through the first base plate 306 at positions corresponding to the upper ends of the guide grooves 342. As shown in FIG. 6, U-shaped cutouts 362 are formed through the second base plate 322 at positions corresponding to the upper ends of the guide grooves 342 (i.e., at positions corresponding to the keyhole-shaped cutouts 360 formed through the first base plate). Wire-shaped guide poles 364, which rise upwardly, are provided in the vicinity of the openings of the U-shaped cutouts 362.

Each of the guide poles 364 has its forward end which is bent to have a U-shaped configuration so that the optical fiber 10 may be supported. The respective guide poles 364 have different heights respectively. They have, for example, ten levels of heights in conformity with the number of the fiber coil reels 100 to be stacked. The respective guide poles 364 are provided on the second base plate 322 such that their heights are successively increased, for example, in the clockwise direction starting from the guide pole 364 having the lowest height.

Recesses 366 for placing the arrays 34 thereon are provided between the U-shaped cutouts 362 on the second base plate 322. The recesses 366 are formed to have meshed bottoms 366a.

Accordingly, the array 34, which is secured to the end of each of the optical fibers 10 drawn from the ten fiber coil reels 100 stacked on the base stand 302, is allowed to slide along the guide groove 342 so that its end surface is exposed downwardly from the pedestal 304. In this state, the holding tab 350 is rotated so that the part of the guide groove 342 is closed by the holding tab 350, and the holding tab 350 is fastened by the stopper 352. Thus, a situation is given, in which the holding tab 350 presses the array 34 against the bottom of the guide groove 342. Therefore, the array 34 is tightly fixed in the guide groove 342 in a state in which its end surface is exposed downwardly from the pedestal 304. The foregoing operation is carried out for all of the arrays 34 secured to the optical fibers 10 led from the plurality of (for example, ten of) stacked fiber coil reels 100.

During this process, the optical fibers 10, which are led from the plurality of fiber coil reels 100, may be bound into one bundle. Otherwise, the individual optical fibers 10 are hung respectively on the plurality of guide poles 364 provided on the second base plate 322. The individual optical fibers 10 are respectively allowed to pass through the plurality of U-shaped cutouts 362 provided through the second base plate 322 and through the plurality of keyhole-shaped cutouts 360 provided through the first base plate 306. Thus, it is possible to ensure pathways for the optical fibers 10 corresponding to the plurality of fiber coil reels 100 respectively. Further, the optical fibers 10 can be prevented from being tangled.

Figure 7:
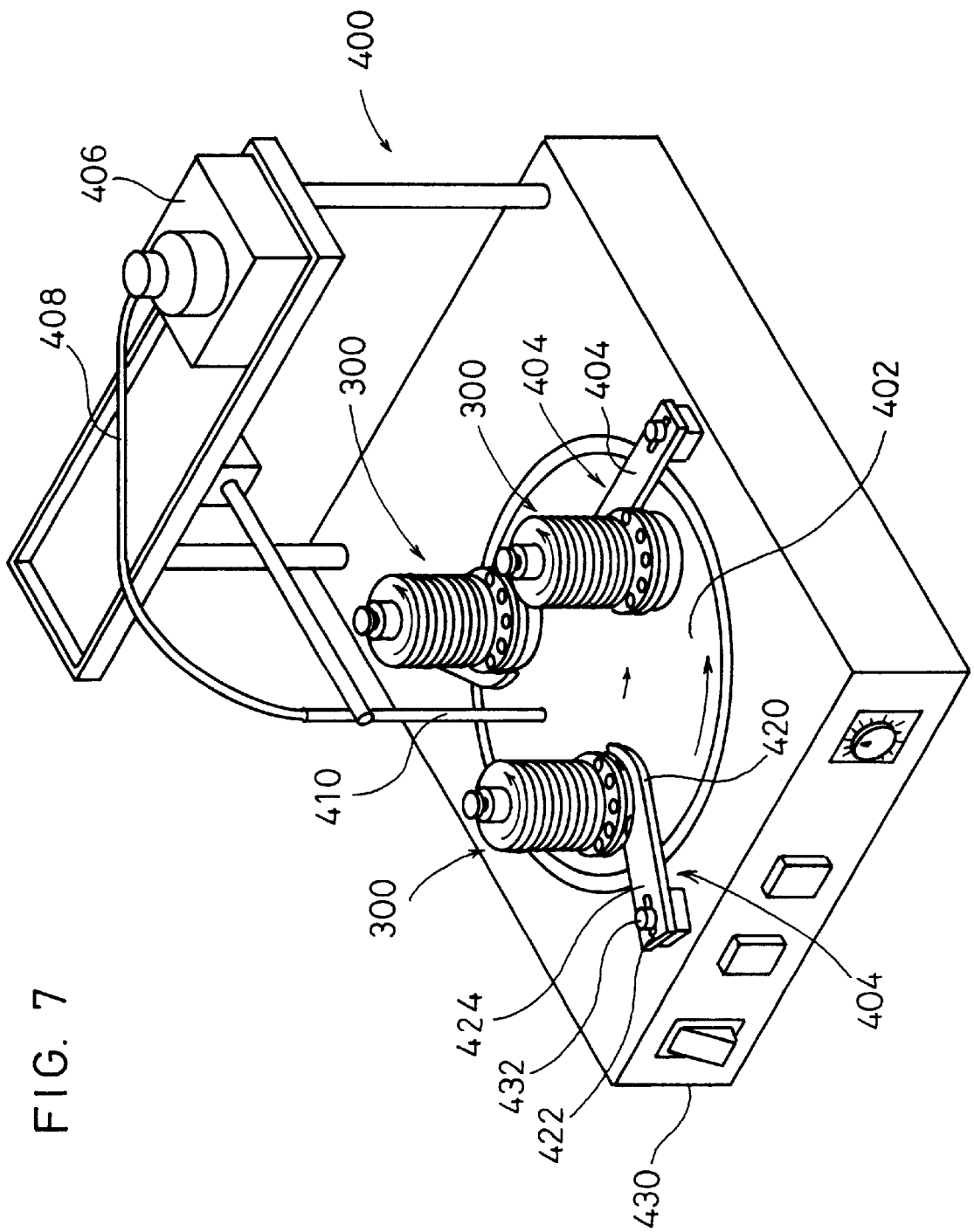
FIG. 7 shows a perspective view illustrating a polishing apparatus according to the embodiment of the present invention.

Next, a polishing apparatus 400 according to the embodiment of the present invention will be explained with reference to FIGS. 7 and 8. As shown in FIG. 7, the polishing apparatus 400 comprises a surface plate 402 for being driven and rotated by a driving control unit (not shown) incorporated in the polishing apparatus 400, driven motion-regulating members 404 for regulating so-called driven motion of revolution associated with rotation of the surface plate 402 so that relative revolving motion around the center is realized, and a pump 406 for supplying pure water and polishing liquid. The pure water and the polishing liquid from the pump 406 are led onto the surface plate 402 via a hose 408 and a nozzle 410.

As shown in FIG. 7 in a representative manner, each of the driven motion-regulating members 404 comprises a main regulating member body 420 formed to have an arc-shaped configuration, and a support section 424 formed integrally with the main regulating member body 420 and having a long hole 422 at its end. Unillustrated disks are rotatably attached to both ends of the arc of the main regulating member body 420 respectively. A shaft 432, which is attached to a housing 430 of the polishing apparatus 400, is inserted through the long hole 422 of the support section 424. The main regulating member body 420 makes swinging movement in accordance with movement of the shaft 432 in the long hole 422. The inner arc of the main regulating member body 420 has the same curvature as the curvature of the jig 300 (exactly speaking, as the curvature of the second base plate 322).

Accordingly, when the jig 300 according to the embodiment of the present invention is placed on the rotating polishing surface plate 402, the jig 300 makes a rotation on its axis in conformity with the direction of rotation of the polishing surface plate, because the speed of rotation of the polishing surface plate 402 is faster at its outer circumference than its inner circumference. During this process, the jig 300 tends to make a revolving movement in accordance with the rotation of the polishing surface plate 402. However, the revolving movement (driven motion) of the jig 300 is regulated by the driven motion-regulating member 404. As a result, the jig 300 makes a relative revolving motion around a certain center with respect to the polishing surface plate 402. That is, the jig 300 make the rotation on its axis in conformity with The direction of rotation of the polishing surface plate 402, and it simultaneously makes the relative revolving motion around the certain center as well.

The portion of the jig 300, which is located on the outer circumferential side of the polishing surface plate 402, presses the driven motion-regulating member 404 in the rightward direction as shown in FIG. 7 in accordance with the rotation of the polishing surface plate 402. However, the pressing force causes the driven motion-regulating member 404 to make movement so that the shaft 432 inserted into the long hole 422 is relatively moved toward one end of the long hole 422 (one end disposed on a side opposite to the main regulating member body 420) while substantially drawing a circular arc. Therefore, the pressing force is escaped away owing to the rotation of the disks (not shown) provided at the both ends of the circular arc of the main regulating member body 420. Accordingly, the jig 300 is substantially subjected to the rotation on its axis and the revolution around the center.

The jig 300 and the polishing apparatus 400 according to the embodiment of the present invention are basically constructed as described above. Next, their function and effect will be explained below.

At first, as shown in FIG. 5, the plurality of (for example, ten of) fiber coil reels 100 are stacked on the base stand 302. The lengthy optical fibers 10 are wound around the respective fiber coil reels 100, and the arrays 34 are secured to the ends of the respective optical fibers 10. The optical fibers 10 are drawn from the respective fiber coil reels 100, and the arrays 34, which are secured to the respective ends, are inserted into the guide grooves 342 of the guide members 340 shown in FIG. 6 respectively. Further, the arrays 34 are fixed in the guide grooves 342 by rotating the holding tabs 350. At this time, the arrays 34 are fixed in the state in which the end surfaces thereof are exposed outwardly from the pedestal 304. The amount of exposure (amount of protrusion) of each of the arrays 34 is adjusted to be uniform by using a clearance gauge. The optical fibers 10, which are drawn from the respective fiber coil reels 100, are hung on the corresponding guide poles 364 provided on the second base plate 322. Further, the optical fibers 10 are guided through the U-shaped cutouts 362 which are provided through the second base plate 322 and through the keyhole-shaped cutouts 360 which are provided through the first base plate 306.

When the jig 300 according to the embodiment of the present invention is placed on the polishing surface plate 402 of the polishing apparatus 400, the respective end surfaces of the plurality of (for example, ten of) arrays 34, which are exposed downwardly from the pedestal 304, contact with the polishing surface plate 402. When the polishing surface plate 402 is rotated, the respective end surfaces of the plurality of arrays 34 are simultaneously polished.

In this embodiment, the plurality of (for example, ten of) fiber coil reels 100 are stacked on the base stand 302. Therefore, the plurality of arrays 34 are uniformly pressed against the polishing surface plate 402 due to their own weights. Thus, the end surfaces of the respective arrays 34 are polished highly accurately. As a result, it is possible to eliminate almost all dispersion in polishing accuracy among the arrays 34.

In the embodiment of the present invention, the jig 300 is introduced into the washing step at the stage after completion of the polishing process or during the polishing process.

Figure 8:
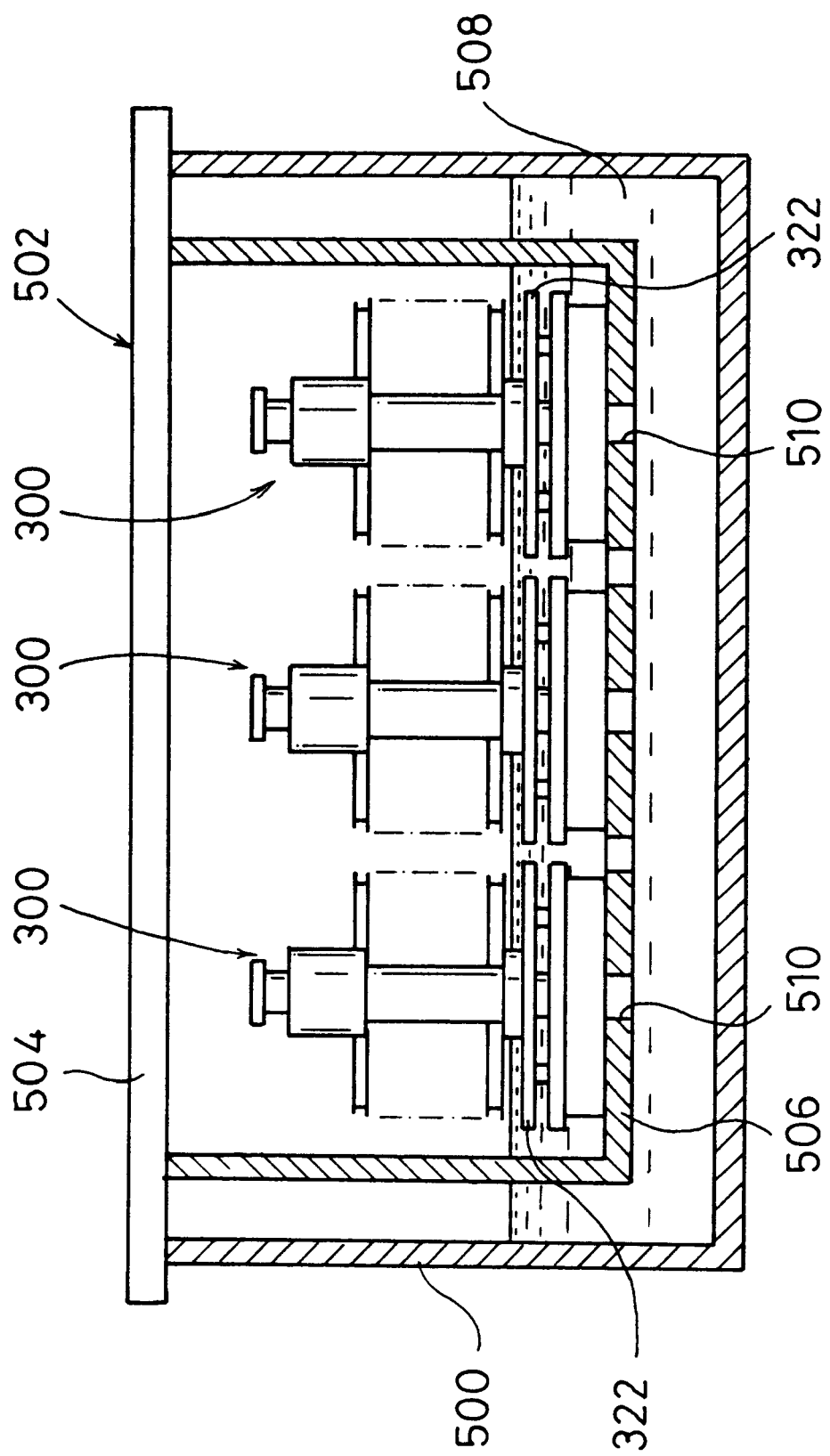
FIG. 8 illustrates a washing tank and a washing jig to be used in a washing step.

As shown in FIG. 8, the washing step is carried out by introducing the jig 300 according to the embodiment of the present invention into a washing tank 500. Specifically, a plurality of (for example, three of) jigs 300 are placed on the bottom of a washing jig 502. The washing jig 502 is used to insert the plurality of jigs 300 into the washing tank 500. The washing jig 502 is made of, for example, a synthetic resin or a metal, comprising, in an integrated manner, a grip section 504 which is formed to have its length larger than the length of the washing tank 500, and a placing section 506 which is fixed to the lower surface of the grip section 504 and which is capable of placing the plurality of jigs 300 thereon. A large number of through-holes 510 are formed through the bottom of the placing section 506 so that a washing liquid 508 is distributed to the plurality of jigs 300.

When the plurality of jigs 300 are washed by using the washing tank 500 and the washing jig 502, the jigs 300 are firstly removed from the polishing apparatus 400. After that, the arrays 34, which are fixed in the guide grooves 342 of the guide members 340, are taken out, and they are placed on the recesses 366 provided on the second base plate 322 respectively.

On the other hand, the washing liquid 508 is poured beforehand into the washing tank 500 up to a height of about ⅓. The plurality of jigs 300 are placed on the bottom of the placing section 506 of the washing jig 502. After that, the washing jig 502 is transported to the position of the washing tank 500 by gripping the grip section 504 manually or by using a chucking mechanism for automatic transport. Subsequently, the washing jig 502 is moved downwardly to introduce the plurality of jigs 300 into the washing tank 500.

In this procedure, the washing jig 502 is moved downwardly until the lower end surface of the grip section 504 abuts against the upper surface of the washing tank 500. At this stage, the upper surface (liquid level) of the washing liquid 508 is positioned higher than the recesses 366 provided on the second base plate 322 of the jig 300. Thus, the arrays 34, which are placed on the recesses 366, are immersed in the washing liquid.

The bottom 366a of each of the recesses 366 is formed to have the meshed form. Therefore, the washing liquid 508 flows through upper and lower portions of the recesses 366. Thus, the respective arrays 34 are efficiently washed (for example, polishing abrasive grains and dust adhered to the arrays 34 during the polishing process are efficiently removed).

The embodiment described above is illustrative of the case in which the arrays 34, which are secured to the optical fibers 10 drawn from the fiber coil reels 100, are polished and washed. Besides, the present invention is also applicable to the case in which the arrays 36 (see FIGS. 3A and 3B), which are secured to the optical fibers 16 (see FIGS. 3A and 3B) drawn from the coupler reels (not shown), are polished and washed. In this case, the jig 300 and the washing jig 502 may be produced in conformity with the diameter of the coupler reel (not shown). Specifically, the coupler reel (not shown) has an inner diameter larger than that of the fiber coil reel 100, and a height which is lower than that of the fiber coil reel 100. Therefore, the diameter of the support shaft 312 may be increased in conformity with the inner diameter of the coupler reel (not shown), and the height of the support shaft 312 may be lowered in conformity with the height of the coupler reel (not shown).

As described above, when the jig 300 according to the embodiment of the present invention is used, for example, the plurality of fiber coil reels 100 are stacked thereon, and the arrays 34, which are secured to the optical fibers drawn from the respective reels 100, are inserted into the guide grooves 342 of the guide members 340. Further, the arrays 34 are fixed by using the holding tabs 350. Thus, the end surfaces of the respective arrays 34 are exposed downwardly from the pedestal 304, and the end surfaces of the respective arrays 34 are horizontal.

In this state, when the jig 300 is placed on the polishing surface plate 402 of the polishing apparatus 400, the exposed end surfaces of the arrays 34 contact with the polishing surface plate 402. In accordance with the rotation of the polishing surface plate 402, the end surfaces of the plurality of arrays 34 are simultaneously polished.

In this procedure, the plurality of fiber coil reels 100 are stacked. Therefore, the plurality of arrays 34 are uniformly pressed against the polishing surface plate 402 owing to their own weights. Thus, the end surfaces of the respective arrays 34 are polished highly accurately. As a result, it is possible to eliminate almost all dispersion in polishing accuracy among the arrays 34, making it possible to produce the optical parts such as the optical fiber gyroscope highly accurately with a good yield.

Especially, when the jig 300 according to the embodiment of the present invention is used, the end surfaces of the respective arrays 34 become horizontal owing to the guide members 340. Therefore, when the guide members 340 suitable for the arrays 34 to be polished are appropriately attached to the circumferential surface of the pedestal 304, it is possible to polish a variety of arrays 34 highly accurately.

The jig 300 according to the embodiment of the present invention comprises the plurality of recesses 366 (array-placing sections) provided on the second base plate 322. Usually, when the polishing step is completed, the arrays 34 are introduced into the washing step to wash the polished surfaces thereof. However, in the embodiment of the present invention, at the stage at which the polishing process is completed for the end surfaces of the plurality of arrays 34, the respective arrays 34 are taken out of the guide grooves 342 of the guide members 240, and they are placed on the recesses 366 so that they may be introduced into the washing step as they are (in the state in which the plurality of reels 100 are stacked, and the arrays 34 are placed on the recesses 366). Such a procedure results in reduction of the number of steps, and it is advantageous in reduction of the production cost of the optical parts such as the optical fiber gyroscope.

The bottom 366a of each of the recesses 366 provided on the second base plate 322 is formed to have the meshed configuration. Therefore, the polished arrays 34 can be efficiently washed with the washing liquid, making it possible to improve the attaching accuracy with respect to the optical IC chip 24.

The embodiment described above is illustrative of the case of application to the polishing process for the arrays 34 secured to the ends of the optical fibers 10 drawn from the fiber coil reels 100 and for the arrays 36 secured to the ends of the optical fibers 16 drawn from the coupler reels (not shown). However, the present invention is not limited thereto. The present invention is applicable to all cases to polish a member secured to an end of a wired object wound around a certain reel.

The polishing apparatus 400 according to the embodiment of the present invention is operated as follows. That is, when the jig 300 according to the embodiment of the present invention is placed on the polishing surface plate 402, the driven motion of the jig 300 is regulated on the polishing surface plate 402 by the aid of the driven motion-regulating member 404. Therefore, the jig 300 is subjected to the rotating motion on its axis aid the revolving motion around the center (in a relative manner). As a result, it is possible to highly accurately polish the end surfaces of a variety of arrays 34. As shown in FIG. 7, when the plurality of (for example, three of) jigs 300 are placed on the polishing surface plate 402 to perform the polishing process, it is possible to avoid any unexpected inversion of each of the jigs 300. Further, the respective jigs 300 can be prevented from colliding with each other. Thus, it is possible to smoothly execute the polishing step.

It is a matter of course that the jig for producing optical parts according to the present invention is not limited to the embodiments described above, which may be embodied in other various forms without deviating from the gist or essential characteristic of the present invention.

What is claimed is:

1. A jig for producing optical parts, comprising:
    a base stand for stacking a plurality of reels around which lengthy fibers are wound in a predetermined number of turns respectively;
    array-holding sections disposed on a circumferential surface of said base stand, for holding a plurality of array members and downwardly exposing respective end surfaces of said array members secured respectively to optical coupling ends of said plurality of fibers led from said respective reels stacked on said base stand; and
    a plurality of fiber guides arranged at different circumferential positions on said base stand for leading said fibers to said array members respectively.

2. The jig for producing optical parts according to claim 1, further comprising guide members attached detachably to said array-holding sections, for making regulation so that said end surfaces of said array members exposed downwardly from said base stand are horizontal.

3. The jig for producing optical parts according to claim 2, wherein:
    said guide member is formed with a guide groove having approximately the same width as a lateral width of said array member; and
    said guide groove is inclined corresponding to an angle of said end surface of said array member so that an angle of inclination of said guide groove with respect to a vertical direction is approximately the same as said angle of inclination of said array member.

4. The jig for producing optical parts according to claim 3, wherein said guide member is provided with an array-holding mechanism for closing a part of said guide groove to hold said array member.

5. The jig for producing optical parts according to claim 4, wherein said array-holding mechanism comprises a support shaft provided at a lower portion of said guide member, a holding tab attached rotatably to said support shaft, and a stopper for regulating rotation of said holding tab.

6. The jig for producing optical parts according to claim 1, further comprising array-placing sections provided on said base stand, for placing said plurality of array members, said array-placing sections having meshed bottoms.

7. The jig for producing optical parts according to claim 1, wherein said plurality of reels stacked on said base stand are reels for winding therearound optical fibers for constructing fiber coils respectively.

8. The jig for producing optical parts according to claim 1, wherein said plurality of reels stacked on said base stand are reels for winding therearound optical fibers led from couplers each of which is used to optically couple an optical fiber led from a light source and an optical fiber to be led to a photodetector respectively.

9. The jig for producing optical parts according to claim 1, further comprising:
   a support shaft installed in an upstanding manner on said base stand, for inserting said reels therethrough; and
   a pressing member attached to an upper end of said support shaft, for pressing said reels from a position thereon.

10. The jig for producing optical parts according to claim 9, wherein said pressing member is inserted into a bolt member screwed into said upper end of said support shaft, and a nut member disposed on said pressing member is screwed into said bolt member to press said reels from said position thereon.

11. The jig for producing optical parts according to claim 10, wherein a collar member is inserted into said bolt member before said pressing member is inserted into said bolt member.

12. A jig for producing optical parts, comprising:
   a base stand for stacking a plurality of reels around which lengthy fibers are wound in a predetermined number of turns respectively;
   array-holding sections disposed on a circumferential surface of said base stand, for downwardly exposing respective end surfaces of array members secured respectively to optical coupling ends of said plurality of fibers led from said respective reels stacked on said base stand; and
   wire-shaped guide poles for supporting the fibers, each guide pole extending upwardly and having a forward end bent to have a U-shaped configuration, said guide poles being arranged at different heights on a circumferential edge of said base stand respectively.

* * * * *